(12) United States Patent
Prestenback et al.

(10) Patent No.: US 9,522,341 B2
(45) Date of Patent: *Dec. 20, 2016

(54) SYSTEM AND METHOD FOR AN INTERACTIVE DEVICE FOR USE WITH A MEDIA DEVICE

(71) Applicant: Disney Enterprises, Inc., Burbank, CA (US)

(72) Inventors: Kyle Prestenback, Burbank, CA (US); Evan Tahler, San Francisco, CA (US)

(73) Assignee: Disney Enterprises, Inc., Burbank, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/972,819

(22) Filed: Aug. 21, 2013

(65) Prior Publication Data

US 2013/0340004 A1 Dec. 19, 2013

Related U.S. Application Data

(63) Continuation of application No. 12/386,581, filed on Apr. 20, 2009, now Pat. No. 8,548,613.

(51) Int. Cl.
| | |
|---|---|
| *G06F 17/00* | (2006.01) |
| *A63H 30/04* | (2006.01) |
| *A63H 3/28* | (2006.01) |
| *H04N 7/173* | (2011.01) |
| *H04N 21/41* | (2011.01) |
| *H04N 21/442* | (2011.01) |
| *H04N 21/6543* | (2011.01) |
| *H04N 21/658* | (2011.01) |

(52) U.S. Cl.
CPC ............. *A63H 30/04* (2013.01); *A63H 3/28* (2013.01); *H04N 7/17318* (2013.01); *H04N 21/4104* (2013.01); *H04N 21/44204* (2013.01); *H04N 21/6543* (2013.01); *H04N 21/6582* (2013.01); *A63H 2200/00* (2013.01)

(58) Field of Classification Search
CPC ........ A63H 30/04; A63H 2200/00; G09B 5/06
See application file for complete search history.

(56) References Cited

U.S. PATENT DOCUMENTS

| | | | | |
|---|---|---|---|---|
| 5,752,880 | A * | 5/1998 | Gabai et al. | 463/1 |
| 6,290,566 | B1 * | 9/2001 | Gabai et al. | 446/175 |
| 6,309,275 | B1 * | 10/2001 | Fong et al. | 446/297 |
| 6,737,957 | B1 * | 5/2004 | Petrovic et al. | 340/5.86 |
| 6,773,344 | B1 * | 8/2004 | Gabai et al. | 463/1 |

(Continued)

*Primary Examiner* — Andrew C Flanders
(74) *Attorney, Agent, or Firm* — Farjami & Farjami LLP

(57) ABSTRACT

There are provided systems and methods for an interactive device for interaction with a user of a media device, wherein the interactive device and the media device are operable to communicate with a server having a memory storing a plurality of states including a present state of the media device playing a media. The interactive device comprises a peripheral hardware for interaction with the user of the media device and a processor configured to establish a communication with the server, obtain the present state of the media device from the server, select an action in response to the present state of the media, and execute the action using the peripheral hardware for interaction with the user of the media device. The interactive device can operate independently of the server or with several interactive devices connected to the server.

20 Claims, 4 Drawing Sheets

(56) References Cited

U.S. PATENT DOCUMENTS

| | | | |
|---|---|---|---|
| 7,505,823 B1 * | 3/2009 | Bartlett et al. .................. | 700/94 |
| 2004/0137929 A1 * | 7/2004 | Jones et al. ................... | 455/517 |
| 2005/0219068 A1 * | 10/2005 | Jones et al. .................... | 341/50 |
| 2010/0197411 A1 * | 8/2010 | Eyzaguirre et al. ............ | 463/43 |

* cited by examiner

SYSTEM AND METHOD FOR AN INTERACTIVE DEVICE FOR USE WITH A MEDIA DEVICE

This application is a Continuation of U.S. patent application Ser. No. 12/386,581, filed on Apr. 20, 2009.

BACKGROUND OF THE INVENTION

1. Field of the Invention

The present invention relates generally to media playback devices. More particularly, the present invention relates to using and operating an interactive device in conjunction with a media device.

2. Background Art

Interactive devices, such as character toys, figures, game devices, and other items based on popular media may provide users with fun and familiar companionship. For example, interactive character devices based on popular live action movies or animation franchises can enable users to welcome their favorite characters as a closer part of their daily lives. However, this relationship between users and interactive devices tends to last for only a limited time, as the interactive devices typically only have a small range of preset behaviors that do not evolve over time. As users exhaust the interactivity possibilities of the interactive devices, such as by hearing all possible recorded phrases or winning all games provided, users might resell the interactive devices or put them away into storage due to lack of interest. This short lived experience may dampen users' enthusiasm for purchasing other interactive devices as users become aware that they may quickly tire of interactive devices with such limited interactivity possibilities.

At the same time, the media used as the original source material for the interactive devices may also be marketed for distribution and usage by media devices in the form of retail packaged media discs, streaming downloads, mobile device downloads, physical or networked video rentals, set-top boxes, broadcast television, and through other distribution channels. The media may also be part of a program still in broadcast, a series having several in-progress parts or sequels, or based on events having periodic live broadcasts, such as sports or drama programs. While users may enjoy watching the above source material on media devices, user participation is typically limited to passive watching, with little or no interactivity from the user. This passive viewing style may wear thin beyond an initial viewing, with users growing tired of viewing the same static content without any additional interactivity or variation. As a result, user enthusiasm for video media may be reduced, leading to a slowdown in media purchases for media devices.

Meanwhile, the interactive devices the users may have also purchased still only provide the preset interactions built into the interactive devices, providing users with isolated interactivity that feels stale and unrealistic. The interactive devices are unable to convey the impression that the interactive devices are related to the content shown by the media devices. For users, the interactive devices are merely short-lived novelties without any lasting relation to their favorite media programs, rather than realistic companions with dynamic and believable personalities.

Accordingly, there is a need to overcome the drawbacks and deficiencies in the art by providing a way for interactive devices and media devices to provide interactivity for users beyond preset, static, and isolated interactions.

SUMMARY OF THE INVENTION

There are provided systems and methods for an interactive device for interaction with a user of a media device, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for an interactive device for interaction with a user of a media device. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
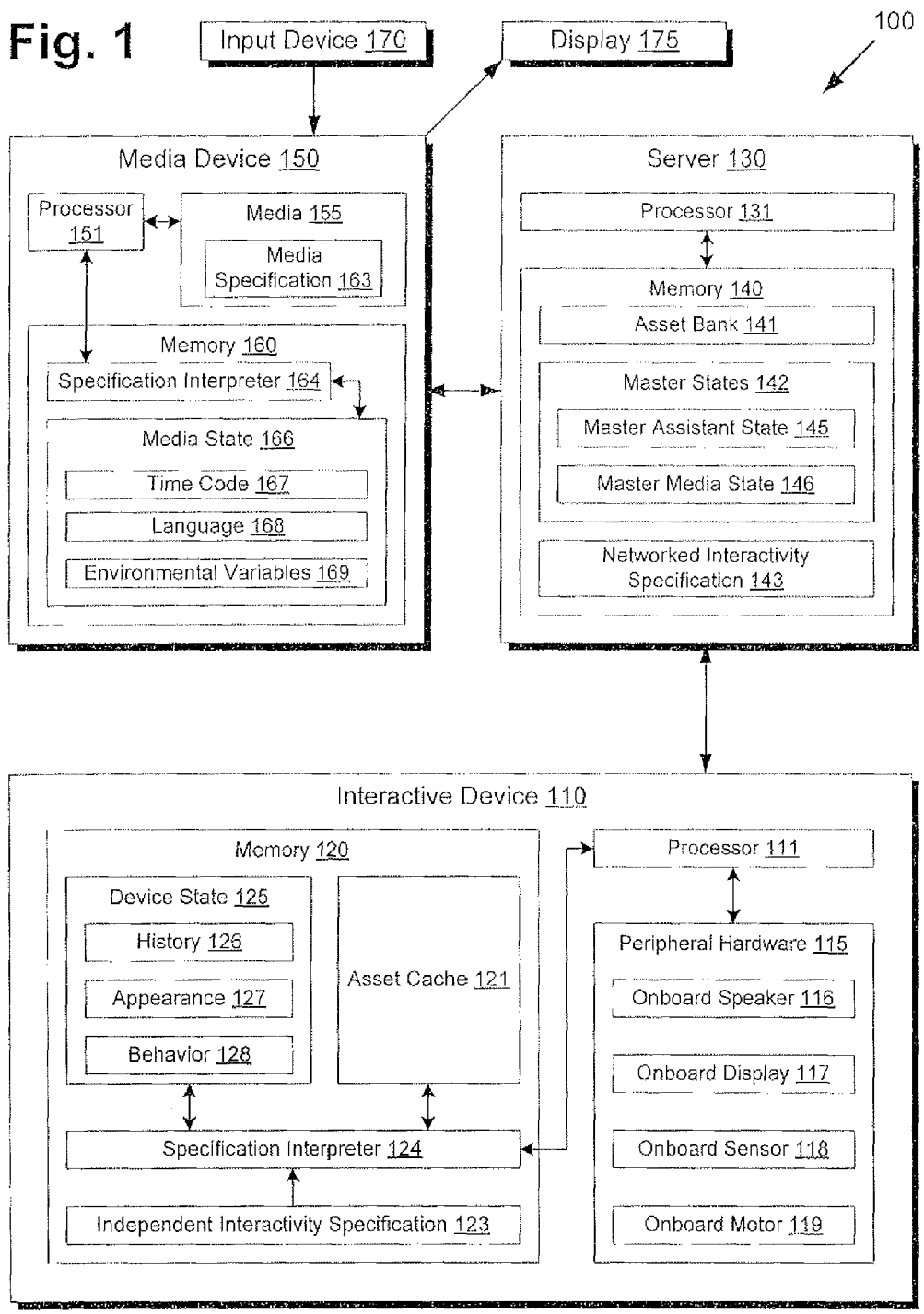
FIG. 1 presents a block diagram of a system for an interactive device for interaction with a user of a media device, according to one embodiment of the present invention.

FIG. 1 presents a block diagram of a system for an interactive device for interaction with a user of a media device, according to one embodiment of the present invention. Environment 100 of FIG. 1 includes interactive device 110, server 130, media device 150, input device 170, and display 175. Interactive device 110 includes processor 111, peripheral hardware 115, and memory 120. Peripheral hardware 115 includes onboard speaker 116, onboard display 117, onboard sensor 118, and onboard motor 119. Memory 120 includes asset cache 121, independent interactivity specification 123, specification interpreter 124, and device state 125. Server 130 includes processor 131 and memory 140. Memory 140 includes asset bank 141, master states 142, and networked interactivity specification 143. Master states 142 include master device state 145 and master media state 146. Media device 150 includes processor 151, media 155, and memory 160. Media 155 includes media specification 163. Memory 160 includes specification interpreter 164 and media state 166. Media state 166 includes time code 167, language 168, and environmental variables 169.

Interactive device 110 can comprise a number of physical embodiments, such as a character figure, a robot toy, an interactive game board, or some other embodiment. Interactive device 110 might, for example, be bundled with a media product such as a Blu-ray disc, or sold separately for use with compatible media. The physical embodiment might, for example, match an appearance of a character or object specific to particular media, or could comprise a more general character that can be used with many different media. This might include, for example, likenesses of actors, people, fictional characters, animals, or other source material from various media.

Interactive device 110 includes various components to support a virtual personality for user interactivity. Processor 111, peripheral hardware 115, and memory 120 can provide the basic processing foundations for input and output. As shown in peripheral hardware 115, various onboard components are included to allow interactive device 110 to respond to its environment. For example, onboard speaker 116 may be used as an audio output device for speech or music, onboard display 117 may be used as a video display to show video animations or a touchscreen user interface, onboard sensor 118 might be used as an input device to detect various environmental stimuli such as sound or force feedback, and onboard motor 119 might be used as a mechanical device to provide vibration, articulation, and movement capabilities.

To react in an intelligent manner, interactive device 110 may use independent interactivity specification 123, which may include a predetermined set of actions utilizing peripheral hardware 115, dependent on the contents of device state 125. By executing specification interpreter 124, processor 111 can interpret and parse independent interactivity specification 123 and device state 125 to provide a convincing and life-like personality. Device state 125 of FIG. 1 includes history 126, appearance 127, and behavior 128. History 126 may include, for example, previous user interactions and a record of past actions and experiences for learning user preferences and modeling future behavior. Appearance 127 may include, for example, variables affecting outward appearance, such as body posture, facial configuration, color, texture, and clothing or other accessories. Behavior 128 may include, for example, emotional states, relationship data for affecting behavior towards a user, preferences, mannerisms, virtual age, and other behavioral modifiers. While device state 125 of FIG. 1 includes these three data stores, alternative embodiments may contain more, less, or different data stores, depending on the types of interactivity to be supported by interactive device 110.

To effectively use peripheral hardware 115, processor 111 may need access to various resources, such as audio media, video media, interface designs, and other data. These resources might be embedded within asset cache 121. Since interactive device 110 may have limited processing resources, memory, and battery power, asset cache 121 may be restricted to only a small subset of the possible assets addressable by interactive device 110. For example, interactive device 110 may be provided with a preloaded configuration through a default independent interactivity specification 123 and a preloaded set of resources within asset cache 121, keyed to the default independent interactivity specification 123. At a later time, interactive device 110 may establish a connection to server 130, enabling a richer range of interactivity via networked interactivity specification 143. Additionally, the connection may allow modification to independent interactivity specification 123, enabling greater functionality by using additional external assets. These additional external assets may include assets from server 130 or other external devices, such as additional voice samples, graphics, or other state data, and can be streamed down from asset bank 141 as necessary if a connection is available, or stored in asset cache 121 for fast local access and availability even when network connectivity is down.

Although in FIG. 1, server 130 is shown as connected to only interactive device 110 and media device 150, alternative embodiments may have server 130 connecting to any arbitrary number of external data sources, such as other interactive devices, other servers, and other media playback devices. Furthermore, server 130 can keep a set of master states concerning past and presently connected devices, or master states 142 in FIG. 1. Master states 142 can therefore provide a simple way for connected devices to request the state of other connected devices, regardless of connection state. Server 130 can update master states 142 as necessary by querying and retrieving present states periodically or on demand, and connected devices may push updated states to server 130 on demand as well.

For example, if interactive device 110 requests the state of media device 150, or media state 166, then server 130 may update master media state 146 to be current with media state 166, then provide master media state 146 back to interactive device 110. If media device 150 is powered off or otherwise unavailable, server 130 can still provide master media state 146 corresponding to a previous time when media device 150 had a connection to server 130, and may further report that media device 150 is currently unavailable. In this manner, server 130 can retain persistent states regarding media playback devices 150 and interactive device 110, even if they are not continuously powered on or connected.

Server 130 may comprise, for example, a dedicated server accessible through the public Internet and maintained by external parties. In another embodiment, server 130 may comprise a personal computer within a local network, such as the user's home computer or laptop, with special server software installed. The server software might be provided as part of the interactive device or media package, to be installed by the user. Additionally, although only one server is shown in FIG. 1, alternative embodiments may utilize multiple servers for load balancing, greater availability, or for other reasons.

Media device 150 may comprise, for example, a Blu-ray player, a DVD-Video player, a personal computer, a video game console, a mobile phone, a set-top box, a broadcast television receiver, a digital video recorder, or any other device capable of video playback or video streaming to a display and connectivity to server 130. Media 155 may comprise, for example, a Blu-ray disc, a DVD-Video disc, or a downloaded media file. Media specification 163 may comprise, for example, Btu-ray Disc Java (BD-J) Xlets, bytecode in the DVD-Video Virtual Machine (VM) command set, Shockwave Flash bytecode, or Silverlight bytecode. Media specification 163 may contain logic support for interactive features provided by media 155, such as, for example, menu navigation, bonus features, interactive games, and network connectivity. Processor 151 may then execute specification interpreter 164 within memory 160 to interpret media specification 163. Specification interpreter 164 may comprise, for example, a Java Virtual Machine (VM), a DVD-Video Virtual Machine, a Shockwave Flash player, a Silverlight player, or another interpreter. Furthermore, specification interpreter 164 may further update media state 166 and use media state 166 for interpreting media specification 163.

Media state 166 of media device 150 may include time code 167, language 168, and environmental variables 169.

Time code 167 may, for example, contain information regarding a presently playing video file, including chapter number, title number, angle selection, time offset, and any other playback details. As media device 150 progresses through a video file, processor 151 may automatically update time code 167 to be consistent with the present position of video playback. Language 168 may include, for example, global preferences for spoken languages and subtitles, and a presently selected spoken language and subtitle setting for media 155. Environmental variables 169 may include, for example, temporary variables and settings for use by media specification 163, such as a media catalog identifier for media 155, or game state data for an interactive game.

To display video and other interactive elements, media device 150 may output visual content to display 175, which may comprise, for example, a high definition television (HDTV), a computer monitor, an embedded LCD screen, or some other video display. To accept user input, a user may use input device 170 to provide input data for media device 150. Input device 170 may comprise, for example, a pointing device such as a mouse or optical pointer, am infrared or Bluetooth remote control or game controller, a touchscreen, or some other device for reading user input. Input device 170 can then receive user input for controlling the flow of video playback, for affecting the configuration of media state 166, and for responding to interactive components of media specification 163.

Thus, interactive device 110 and media device 150 may operate independently of each other, and may also operate in a networked manner if connectivity to server 130 can be established. If such connectivity is established, interactive device 110, media device 150, and any other connected device can, via master states 142, affect a state of another device, retrieve a state of another device, and deposit an updated state. Moreover, interactive device 110 can enhance its capabilities beyond independent interactivity specification 123 by, for example, retrieving networked interactivity specification 143 and additional resources from asset bank 141. Interactive device 110 can therefore use states of externally networked devices as a context to affect specification interpreter 124, and media device 150 can similarly use states of externally networked devices as a context to affect specification interpreter 164. For example, behavior 128 of interactive device 110 may dynamically adjust depending on a present state of time code 167, and environmental variables 169 of media device 150 may dynamically adjust depending on a present state of history 126.

Figure 2:
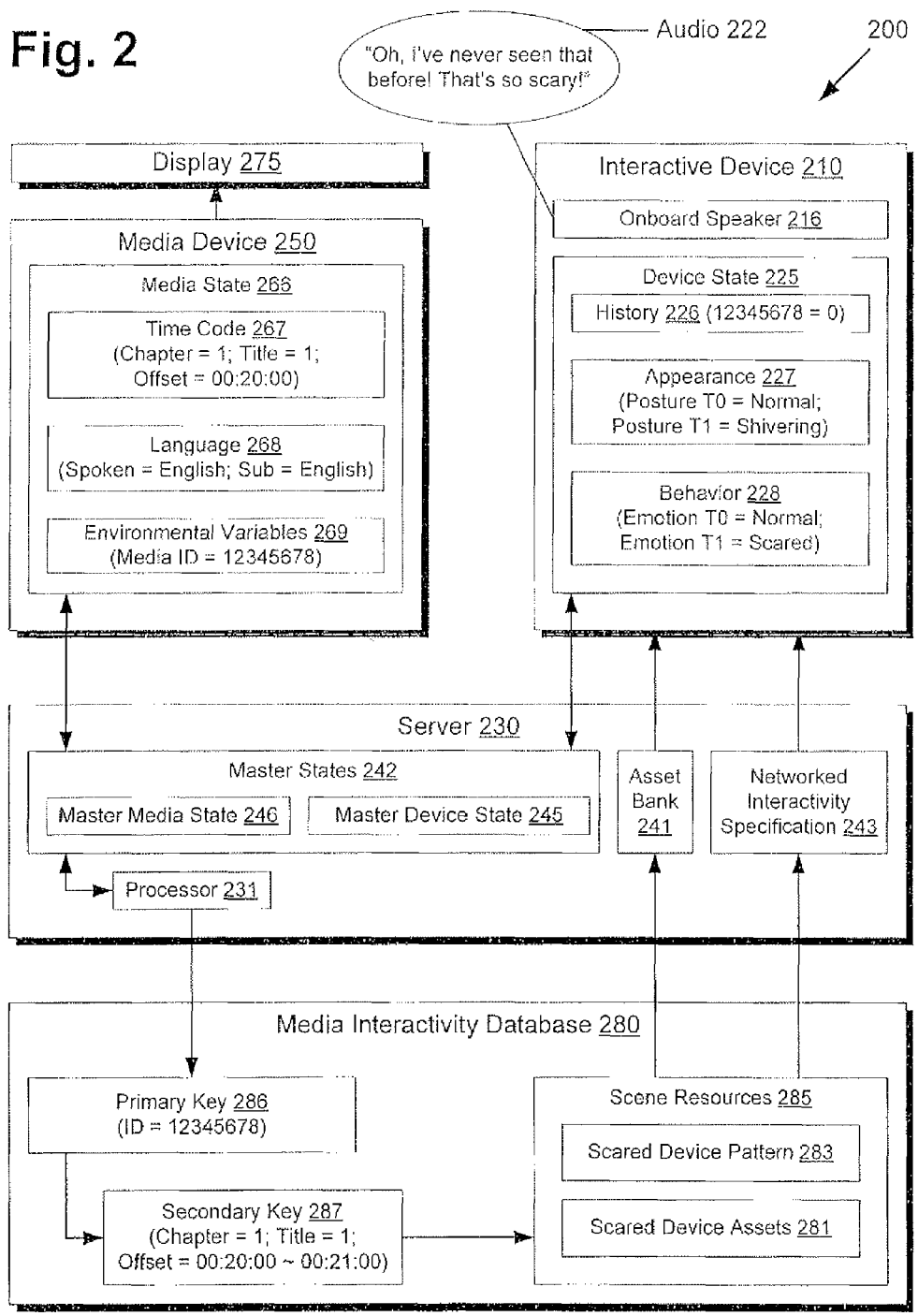
FIG. 2 presents another block diagram of a system for an interactive device for interaction with a user of a media device, according to one embodiment of the present invention.

FIG. 2 presents another block diagram of a system for an interactive device for interaction with a user of a media device, according to one embodiment of the present invention. Environment 200 of FIG. 2 includes interactive device 210, audio 222, server 230, media device 250, display 275, and media interactivity database 280. Interactive device 210 includes onboard speaker 216 and device state 225. Device state 225 includes history 226, appearance 227, and emotion 228. Server 230 includes processor 231, master states 242, asset bank 241, and networked interactivity specification 243. Master states 242 include master media state 246 and master device state 245. Media device 250 includes media state 266. Media state 266 includes time code 267, language 268, and environmental variables 269. Media interactivity database 280 includes primary key 286, secondary key 287, and scene resources 285. Scene resources 285 include scared device pattern 283 and scared device assets 281. With regards to FIG. 2, it should be noted that interactive device 210 corresponds to interactive device 110 from FIG. 1, that server 230 corresponds to server 130, that media device 250 corresponds to media device 150, and that display 275 corresponds to display 175. Additionally, elements such as processors, memory, and peripheral hardware have been removed from FIG. 2 for clarity purposes.

In an example illustrated by environment 200 of FIG. 2, interactive device 210 relies on media state 266 of media device 250 as a context to provide interaction via networked interactivity specification 243. For example, interactive device 210 may comprise a robot toy that provides contextual commentary to enhance a viewer's enjoyment during media playback. The commentary may thus be keyed to respond to particular known positions of time code 267. In this manner, the viewer can feel like they are watching the media with a good friend or a lively companion, who provides timely and relevant conversation at key points during playback. The logic to implement this companion may be embedded within networked interactivity specification 243. One example commentary voice sample is shown as audio 222 in FIG. 2, where onboard speaker 216 of interactive device 210 is used to say, "Oh, I've never seen that before! That's so scary!"

For interactive device 210 to provide the context sensitive interaction, interactive device 210 may need an awareness of media state 266. Media device 250 may provide media state 266 to server 230, with time code 267 indicating playback at chapter 1, title 1, and an offset of 20 minutes, language 268 indicating English selected for spoken language and subtitles; and environmental variables 269 indicating that a selected media for playback has a media ID of "12345678." Server 230 may store media state 266 as master media state 246 within master states 242.

Additionally, interactive device 210 may provide its own state, device state 225, to server 230, with history 226 indicating that interactive device 210 was previously concurrently active for a total of zero (0) complete playbacks or view counts of a media having a media ID of 12345678. In other words, from the perspective of interactive device 210, it is presently "viewing" the media playing on media device 250 for the first time. Additionally, appearance 227 and behavior 228 may be provided for server 230, indicating at time T0 an initial posture of "normal" and an initial emotional state of "normal."

Processor 231 of server 230 may then consult media interactivity database 280 to retrieve appropriate resources and behaviors for interactive device 210, based on the contents of master states 242, including master media state 246 and master device state 245. For example, a database query may be executed against master media state 246, with media ID 12345678 matching to primary key 286 and chapter 1, title 1, offset 00:20:00 matching to secondary key 287. Secondary key 287 may then reference scene resources 285, including scared device pattern 283 and scared device assets 281. Scene resources 285 may be keyed to a particular scary scene of the media defined by the position detailed by primary key 286 and secondary key 287, allowing interactive device 210 to behave contextually and realistically in a scared manner. Media interactivity database 280 may provide, for example, voice samples for audio output from scared device assets 281 for depositing in asset bank 241, and behavioral scripts for acting scared from scared device pattern 283 for integrating within networked interactivity specification 243.

Once asset bank 241 and networked interactivity specification 243 are appropriately populated, a processor of interactive device 210 can interpret networked interactivity specification 243 to react convincingly to the media content being displayed on display 275. For example, at a present time T1, appearance 227 may change from "normal" to "shivering" to convey fear, and behavior 228 may change from a default "normal" behavioral script to a jittery "scared" behavioral script. To translate these into observable manifestations, peripheral hardware of interactive device 210 might be leveraged appropriately. For example, an onboard motor might be initiated to cause interactive device 210 to vibrate and "shiver" in fear, or to cause interactive device 210 to scamper behind a couch until the scary scene referenced by master media state 246 is over.

Additionally, based on the contents of master media state 246, networked interactivity specification 243 may select a voice sample from asset bank 241 to playback via onboard speaker 216. As shown in FIG. 2, audio 222 includes the spoken statement, "Oh, I've never seen that before! That's so scary!" Since history 226 indicated that interactive device 210 is viewing the scene on display 275 for the first time, the phrase "Oh, I've never seen that before!" may be specifically selected from a range of different reactions. In this manner, audio 222 is selected to relate to the scary scene from the presently playing media referenced by master media state 246, thus providing a contextual interaction. While outputting voice samples and causing mechanical movement have been given as example reactions to the scary scene, any arbitrary action by a peripheral hardware of interactive device 210 could be triggered, such as blinking attached LED lights, or streaming a video clip on an onboard display, for example.

To give an alternative example, if history 226 instead indicated that media ID 12345678 has a view count of 10 times, a different voice sample might be selected, where audio 222 instead contains the phrase, "That scene startles me every time!" If elements of master media state 246 are changed as well, then yet another voice sample might be selected. For example, if language 268 indicates Spanish as the spoken language, the voice samples might be selected from Spanish voice samples, rather than English voice samples. Additionally, if interactive device 210 includes an onboard display, then the subtitle language selected in language 268 might be used to select a matching subtitle language for the onboard display.

Of course, a robot toy reacting to pre-recorded media is only one particular implementation chosen as an example. In alternative embodiments, interactive device 210 may also react to presently streaming and live media broadcasts, and not just pre-recorded media. For example, for sports fans, interactive device 210 might comprise a figure of a cheerleader wearing a logo for a popular sports team. When media device 250 shows the same sports team scoring a goal on display 275, media state 266 may be updated to reflect that the sports team just scored a goal. In turn, master media state 246 may be updated to reflect media state 266. Interactive device 210 might provide server 230 with master device state 245, identifying interactive device 210, the cheerleader figure, as allied with the same popular sports team. Networked interactivity specification 243 may specify as a rule that if a sports team scoring a goal recorded in master media state 246 matches the sports team in master device state 245, then interactive device 210 should perform the dance and cheer provided by asset bank 241. Media interactivity database 280 may contain various dance routines for all possible cheerleader figures for each sports team. Since the dance and cheer is centralized and provided by media interactivity database 280, new dance routines may be easily added as the sports season progresses, providing the sports fans with extra enjoyment from their sports watching.

Additionally, a reversed control structure can be utilized, where interactive device 210 instead affects the behavior of media device 250. For example, in one embodiment, behavior 228 of interactive device 210 might indicate an emotion of "sadness," because the user has neglected to use and play with interactive device 210 for a long time. In this state, interactive device 210 may assert some control over media state 266 until behavior 228 returns to a "normal" emotion. For example, to express its loneliness, interactive device 210 may prevent time code 267 from continuing to playback the video content originally selected by the user until the user provides sufficient interaction with interactive device 210 to change behavior 228 from "sadness" to a "normal" emotion. To provide such an interaction, interactive device 210 might direct media device 250 to show an interactive game on display 275 by modifying media state 266 to access an interactive game on the media instead of the original video content. The user might then use interactive device 210 as an input device to play the interactive game via display 275. Once a predetermined number of games are played, or after a predetermined length of time, behavior 228 might revert to a "normal" emotion, and media state 266 may revert back to its original state, allowing the user to play the original video content, and reminding the user that interactive device 210 might become lonely without occasional play sessions.

In other embodiments, interactive device 210 might control media device 250 via server 230 to play special or different media segments or provide augmented video playback based on certain conditions. For example, interactive device 210 might include an internal clock that is able to synchronize date and time with server 230. If interactive device 210 determines that today's date is a holiday, then special behaviors at media device 250 might be implemented by modifying media state 266. For example, prior to or during showing the original video content, media device 250 may be directed to display a special feature video or video segment about the holiday by modifying time code 267. Time code 267 may be changed to reference a special Christmas video if the date is detected as Christmas Day. After the Christmas video is clone playing, then media state 266 may revert back to its original state and continue playing the original video content.

Alternatively, media state 266 may be modified for special augmented behavior during the original video content playback. For example, continuing with the Christmas Day example, environmental variables 269 may be modified to reference a special. Christmas themed secondary overlay, where the user can observe display 275 showing the original video content bordered by a festive frame with Christmas lights and falling snow. In this manner, interactive device 210 can initiate a complex range of interactions through media device 250, providing unique and surprising experiences for the user.

Figure 3:
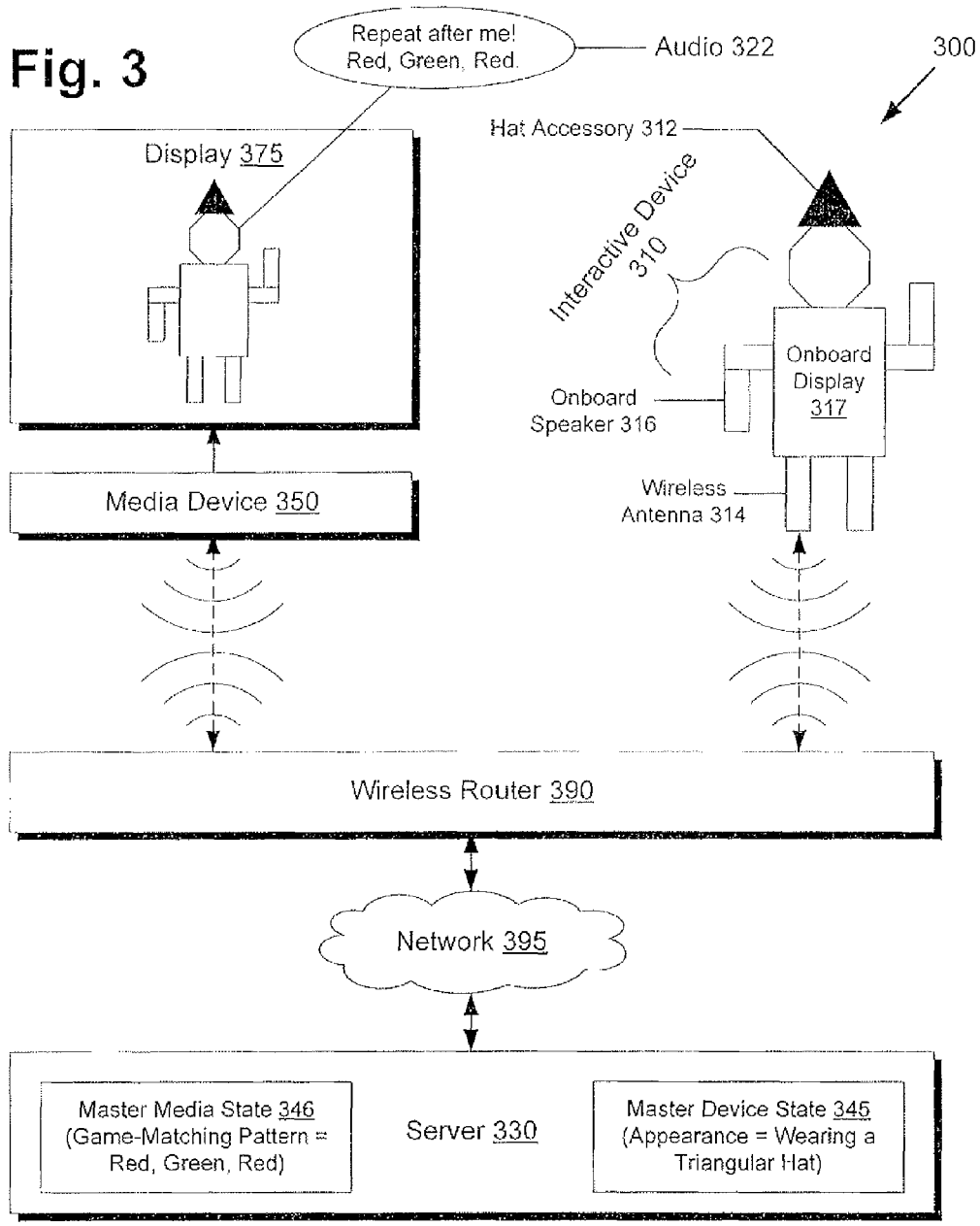
FIG. 3 presents a diagram of an interactive device for interaction with a user of a media device, according to one embodiment of the present invention.

FIG. 3 presents a diagram of an interactive device for interaction with a user of a media device, according to one embodiment of the present invention. Diagram 300 of FIG. 3 includes interactive device 310, audio 322, server 330, media playback device 350, display 375, wireless router 390, and network 395. Interactive device 310 includes hat accessory 312, wireless antenna 314, onboard speaker 316, and onboard display 317. Server 330 includes master media state 346 and master device state 345. With regards to FIG. 3, it should be noted that display 375 corresponds to display 275 from FIG. 2, that media playback device 350 corresponds to media device 250, that interactive device 310 corresponds to interactive device 210, and that server 330 corresponds to server 230.

While FIG. 2 described a state of a media playback device affecting the state or behavior of an interactive device, FIG. 3 also includes a state of interactive device 310 affecting the state or behavior of media playback device 350. For example, it can be observed that interactive device 310 is currently wearing hat accessory 312, and a processor of interactive device 310 may take note of this detail. The processor may then utilize wireless antenna 314 to transfer this state information to master device state 345 using wireless router 390 and network 395. Network 395 may comprise, for example, a publicly accessible network such as the Internet, whereas wireless router 390 may service a more restricted private local network including interactive device 310 and media playback device 350. Media playback device 350 can then retrieve master device state 345 from server 330 via wireless router 390 and render video content representing interactive device 310 on display 375, noting that the appearance of interactive device 310 should include "wearing a triangular hat." The video content may, for example, comprise a secondary video overlay over primary video content, or may comprise a dedicated bonus feature separate from a feature presentation. Similarly, if a user decides to remove hat accessory 312, that fact can also be transmitted via wireless router 390, master device state 345 may be updated to note the lack of any hats worn, and display 375 may be updated so that no hat is shown.

In the other direction, media playback device 350 may contain state information concerning, for example, a simple memory exercise game where a user is asked to press colored buttons in a specified order. The specified order may, for example, be announced through an audio subsystem connected to video playback device 350, allowing audio 322 to be heard: "Repeat after me! Red, Green, Red." This game-matching pattern may then be stored in master media state 346 via wireless router 390 and network 395. Interactive device 310 may then retrieve master media state 346 from server 330 to compare against button presses received from onboard display 317, which might for example comprise a touchscreen presenting the colored buttons. If the user repeats the pattern correctly, onboard speaker 316 might be used to congratulate the user, and the success may be noted in master device state 345 for media playback device 350 to gauge the user's game progress. If the user makes a mistake in repeating the pattern, onboard speaker 316 might alternatively encourage the user to try again and note in master device state 345 that the current game-matching pattern might be too difficult for the user, allowing media playback device 350 to dynamically adjust the game difficulty and/or keep track of a running total score.

As previously discussed in conjunction with FIG. 1, interactive device 310 can also operate in an independent manner if no communications network is available, or if other devices are currently in an off state. For example, if wireless router 390, network 395, or server 330 are unavailable, then network connections might be terminated between media playback device 350, interactive device 310, and server 330. Before communications is cut off, interactive device 310 might retrieve a smaller subset of interactive games, videos, and other entertainment from media playback device 350, allowing interactive device 310 to still operate independently within hardware constraints imposed by a non-connected environment. For example, rather than offering several different games for interaction, interactive device 310 may only offer one or two interactive games when no network connection is available. Of course, interactive device 310 may also be populated in advance with various interactive content, allowing independent interactivity even if interactive device 310 never connects to server 330.

Conversely, when network connectivity is available, the capabilities of interactive device 310 may be broadened and expanded. For example, if server 330 is further configured to interface with an e-mail server hosting the user's e-mail, then interactive device 310 can receive notifications regarding new e-mail, and onboard speaker 316 might be used to announce, "You have new mail from your friend John." Similarly, if server 330 has a data sharing arrangement with a weather forecast service, then interactive device 310 might periodically comment on the weather, saying things like, "It looks like it might rain today, you should take your umbrella." Other data sources, such as sports news, world events, and other feeds may also be used to provide interactive device 310 with new information for comment. In this manner, interactive device 310 can appear to be aware of the surrounding world, rather than being limited to a small range of predetermined expressions.

Moreover, as previously discussed, server 330 might also have the capability to connect to several interactive devices. This capability might be used, for example, to support multiplayer interactions in conjunction with media playback device 350. For example, a media in use by media playback device 350 might support the game of Battleship, where players try to shoot down and sink their opponent's battleships by guessing the location of their opponent's battleships on a square grid. Each player may have their own interactive device, similar to interactive device 310. Similarly, a touch sensitive onboard display similar to onboard display 317 might be provided on each interactive device, allowing each player to position their own ships or to select a position to attack on their opponent's grid.

Server 330 can centralize game logic by keeping track of each player grid, or device state, for each of the interactive devices, as well as accepting input data from each onboard display. In alternative embodiments, media playback device 350 may instead centralize or share some of the game logic duties from server 330. Delegating some logic duties to media playback device 350 may help reduce processing load at server 330, which is already responsible for maintaining a communications network between interactive devices and media playback device 350.

Although the game of Battleship might be implemented using a conventional board game configuration, the usage of multiple interactive devices along with server 330 and media playback device 350 may provide some additional atmospheric feedback to enhance the ambience of the game and heighten user enjoyment. For example, if server 330 calculates a hit to a ship, media playback device 350 might be instructed to playback a video clip showing a ship being shot down and sinking into the ocean. Alternatively, if server 330 determines that a player just fired a miss, media playback device 350 might be instructed to playback a video clip showing a torpedo firing into empty waters. The video clips might also vary depending on the size of the battleship destroyed, with larger battleships initiating a longer, more impressive video clip with colorful pyrotechnics. This video feedback might allow the players to feel like they are really waging a war at sea, rather than just abstractly selecting spots on a grid, as might be the case for a conventional board game.

Figure 4:
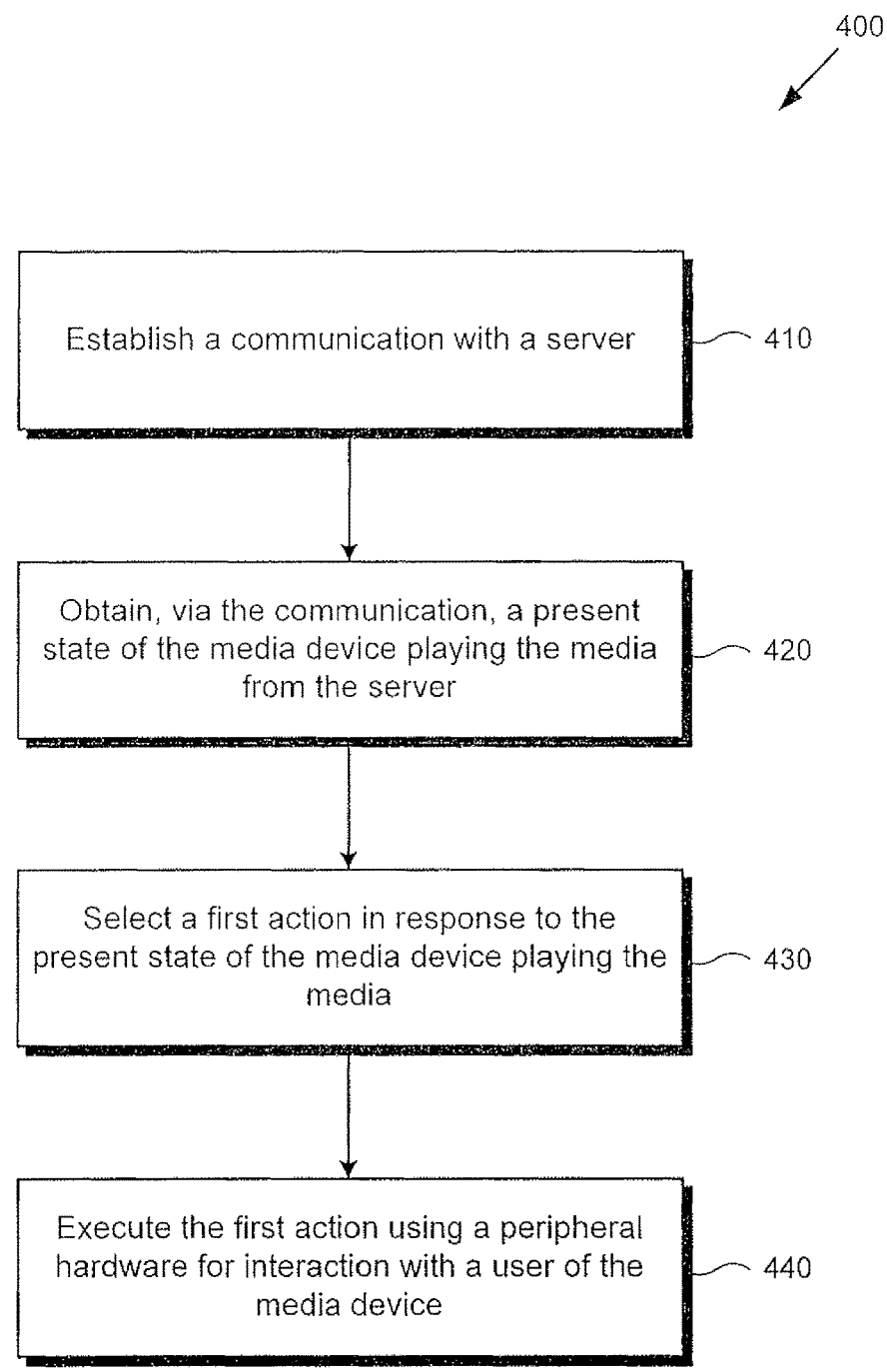
FIG. 4 shows a flowchart describing the steps, according to one embodiment of the present invention, by which an interactive device can provide an interaction for a user of a media device.

FIG. 4 shows a flowchart describing the steps, according to one embodiment of the present invention, by which an interactive device can provide an interaction for a user of a media device. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and environment 100 of FIG. 1, step 410 of flowchart 400 comprises processor 111 of interactive device 110 establishing a communication with server 130. As in FIG. 3, this communication may be established using a wireless router and a public network such as the Internet. Alternative embodiments may use wired connections, or local private networks. Additionally, server 330 may be maintained by external parties, or hosted directly on hardware owned by a user, such as a personal desktop or notebook computer with server software installed.

Referring to step 420 of flowchart 400 in FIG. 4 and environment 100 of FIG. 1, step 420 of flowchart 400 comprises processor 111 of interactive device 110 obtaining, via the communication established in step 410, master media state 146. To accomplish this, processor 111 might request the state of media device 150 via the communication. Server 130 is responsible for keeping master media state 146 updated to media state 166 as necessary, and for expanding the capabilities of networked interactivity specification 143 while a connection to media device 150 is active. Thus, processor 111 need only concern itself with obtaining data during step 420, leaving most updating logic centralized at server 130. In this manner, future logic updates can be readily distributed to connected interactive devices via server 130, including new or modified interactive device behaviors to networked interactivity specification 143, new or modified assets to asset bank 141, and other additional features and changes.

Referring to step 430 of flowchart 400 in FIG. 4 and environment 100 of FIG. 1, step 430 of flowchart 400 comprises processor 111 of interactive device 110 selecting an action in response to master media state 146. This can be accomplished, for example, by interpreting networked interactivity specification 143 retrieved using master media state 146 to select the action. Optionally, device state 125 may also influence the selection of the action. Using the example illustrated by FIG. 2, master media state 146 would indicate a position in the presently selected media where a scary scene is to occur, device state 125 would indicate that interactive device 110 has never seen this scary scene before, and networked interactivity specification 143 may dictate that scary scenes from media device 150 should elicit a scared response from interactive device 110. Thus, an appropriate action to select may be to exclaim that interactive device 110 has never seen the scary scene before, and to comment on how scary it is, which may look similar to the phrase spoken in audio 222 of FIG. 2, "Oh, I've never seen that before! That's so scary!"

Networked interactivity specification 143 may, for example, comprise a collection of conditions and rules to guide the behavior or output of interactive device 110 based on inputs received from media device 150, such as master media state 146. As mentioned, one such rule may be that input indicating a "scary scene" is playing on media device 150 should result in "scared behavior" from interactive device 110. These rules and conditions might, for example, be stored as a database of conditions and results similar to media interactivity database 280 in FIG. 2. Meeting a certain condition such as matching a time code and media identifier of master media state 246 to a known scene detailed by primary key 286 and secondary key 287 allows media interactivity database 280 to provide results compliant with the condition, or scared device pattern 283 and scared device assets 281 of scene resources 285. In turn, server 230 can update asset bank 241 and networked interactivity specification 243 accordingly, allowing interactive device 210 to retrieve resources from server 230 to select an action providing convincing and realistic behavior that appears to depend on the contents of display 275.

While the embodiment shown in FIG. 2 utilizes media interactivity database 280 for selecting the action, alternative embodiments may use other methods for the selection of the action. For example, a procedural or object oriented state machine, a simple table of conditions and results, a declarative interpreter, or any other mechanisms and data structures may be utilized. Implementations might be chosen based on the complexity of interactions desired from interactive device 210 or media device 250. As previously noted, since the behavioral logic contained in media interactivity database 280 is centralized by restricting access via server 230 as a gateway, rules and conditions of behavior can be easily modified and changed in the future. Additionally, processor 231 may be leveraged to provide computational resources for modeling behavior much greater than the capabilities of media device 250 or interactive device 210 in isolation, allowing for nuanced and realistic behaviors.

Referring to step 440 of flowchart 400 in FIG. 4 and environment 100 of FIG. 1, step 440 of flowchart 400 comprises processor 111 of interactive device 110 executing the action selected from step 430 using peripheral hardware 115 to provide interaction with a user of media device 150. Since the selected action from step 430 is to speak a phrase, onboard speaker 116 of peripheral hardware 115 may be utilized to playback for the user the voiced phrase, "Oh, I've never seen that before! That's so scary!" In this manner, the user can recognize that interactive device 110 is viewing the currently playing media for the first time. The user can also recognize that interactive device 110 is sensitive to the present context of media device 150, or that a scary scene is presently being shown on display 175 and eliciting a scared reaction from interactive device 110. In this manner, the user can feel like a fun and engaging buddy is also sharing the media watching experience, providing a realistic companionship experience and enhancing the user's enjoyment. Moreover, due to the centralized behavior rules and conditions provided by server 130, future variations, changes, and additions can be easily implemented, extending the valuable life of interactive device 110 for the user.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An interactive device operable to interact with a playback device playing a video on a display, the interactive device comprising:
   a peripheral hardware for interaction with a user of the interactive device;
   a non-transitory memory including a record of past interactions of the user with the playback device using the interactive device;
   a processor configured to:
      wirelessly transmit a state information relating to a present state of the interactive device, wherein the state information includes at least one of a present behavioral state and a present appearance state of the interactive device and causes the playback device to modify the video being played by the playback device based on the at least one of the present behavioral state and the present appearance state of the interactive device;
      wirelessly receive one or more codes generated by the playback device while playing the video on the display, the one or more codes relating to one or more events occurring in the video being played by the playback device on the display; and
      execute one or more actions in response to each of the one or more codes using the peripheral hardware.

2. The interactive device of claim 1, wherein the one or more codes are one or more time codes.

3. The interactive device of claim 2, wherein the one or more codes include information relating to the video.

4. The interactive device of claim 3, wherein the information includes at least one of a chapter number, a title number, an angle selection and a time offset.

5. The interactive device of claim 3, wherein the interactive device is in communication with a server, and the processor is configured to wirelessly receive the one or more codes generated by the playback device from the server.

6. The interactive device of claim 1, wherein the one or more codes control an outward appearance of the interactive device, and wherein the outward appearance of the interactive device includes at least one of a body posture, a facial configuration, a color, a clothing and an accessory of the interactive device.

7. The interactive device of claim 1, wherein the one or more codes cause the interactive device to present an emotional behavior.

8. The interactive device of claim 7, wherein the emotional behavior presented by the interactive device includes acting scared.

9. The interactive device of claim 1, wherein the video has a plurality of segments each associated with one of a plurality of time codes, and wherein the state information modifies a present time code associated with a first segment of the video being played by the playback device to a different time code associated with a second segment of the video for playing the second segment by the playback device in response to receiving the state information.

10. A method for use by an interactive device operable to interact with a playback device playing a video on a display, the interactive device having a processor, a non-transitory memory including a record of past interactions of a user with the playback device using the interactive device, and a peripheral hardware for interaction with the user of the interactive device, the method comprising:
   wirelessly transmitting, using the processor, a state information relating to a present state of the interactive device, wherein the state information includes at least one of a present behavioral state and a present appearance state of the interactive device and causes the playback device to modify the video being played by the playback device based on the at least one of the present behavioral state and the present appearance state of the interactive device;
   wirelessly receiving, using the processor, one or more codes generated by the playback device while playing the video on the display, the one or more codes relating to one or more events occurring in the video being played by the playback device on the display; and
   executing one or more actions in response to each of the one or more codes using the peripheral hardware.

11. The method of claim 10, wherein the one or more codes are one or more time codes.

12. The method of claim 11, wherein the one or more codes include information relating to the video.

13. The method of claim 12, wherein the information includes at least one of a chapter number, a title number, an angle selection and a time offset.

14. The method of claim 12, wherein the interactive device is in communication with a server, and the wirelessly receiving receives the one or more codes generated by the playback device from the server.

15. The method of claim 10, wherein the one or more codes control an outward appearance of the interactive device, and wherein the outward appearance of the interactive device includes at least one of a body posture, a facial configuration, a color, a clothing and an accessory of the interactive device.

16. The method of claim 10, wherein the one or more codes cause the interactive device to present an emotional behavior.

17. The method of claim 16, wherein the emotional behavior presented by the interactive device includes acting scared.

18. The method of claim 10, wherein the video has a plurality of segments each associated with one of a plurality of time codes, and wherein the state information modifies a present time code associated with a first segment of the video being played by the playback device to a different time code associated with a second segment of the video for playing the second segment by the playback device in response to receiving the state information.

19. A media device for interaction with an interactive device, the media device comprising:
   a processor configured to:
      play a video on a display;
      wirelessly receive, while playing the video on the display, a present state information of the interactive device, wherein the present state information includes at least one of a present behavioral state and a present appearance state of the interactive device;
      modify the video being played on the display based on the at least one of the present behavioral state and the present appearance state of the interactive device; and
      wirelessly transmit one or more codes generated while playing the video on the display, the one or more codes relating to one or more events occurring in the video being played on the display, wherein the one or more codes cause the interactive device to execute one or more actions.

20. The media device of claim 19, wherein the video has a plurality of segments each associated with one of a plurality of time codes, and wherein the state information modifies a present time code associated with a first segment of the video being played by the playback device to a different time code associated with a second segment of the video for playing the second segment by the playback device in response to receiving the state information.

* * * * *